(12) United States Patent
Chen et al.

(10) Patent No.: US 12,546,337 B2
(45) Date of Patent: Feb. 10, 2026

(54) MOTIONLESS MOLTEN SALT PUMP ON LEVERAGE OF PRESSURE VARIATION FORCE

(71) Applicant: UNM Rainforest Innovations, Albuquerque, NM (US)

(72) Inventors: Minghui Chen, Albuquerque, NM (US); Mingfu He, Albuquerque, NM (US)

(73) Assignee: UNM Rainforest Innovations, Albuquerque, NM (US)

( * ) Notice: Subject to any disclaimer, the term of this patent is extended or adjusted under 35 U.S.C. 154(b) by 0 days.

(21) Appl. No.: 18/977,814

(22) Filed: Dec. 11, 2024

(65) Prior Publication Data

US 2025/0188955 A1 Jun. 12, 2025

Related U.S. Application Data

(60) Provisional application No. 63/608,767, filed on Dec. 11, 2023.

(51) Int. Cl.
| | | |
|---|---|---|
| *F04F 1/02* | (2006.01) | |
| *F04F 3/00* | (2006.01) | |
| *F04F 5/10* | (2006.01) | |
| *F04F 5/24* | (2006.01) | |
| *F04F 5/46* | (2006.01) | |

(52) U.S. Cl.
CPC ......... *F04F 1/02* (2013.01); *F04F 3/00* (2013.01); *F04F 5/10* (2013.01); *F04F 5/24* (2013.01); *F04F 5/461* (2013.01); *F04F 5/465* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,454,696 A | * | 10/1995 | Wilkinson | F04F 5/44 417/198 |
| 11,097,959 B2 | * | 8/2021 | Choi | F03G 6/067 |
| 2001/0054687 A1 | * | 12/2001 | Kato | H01J 49/044 250/288 |
| 2003/0150219 A1 | * | 8/2003 | Bishop | F17C 7/00 62/53.1 |
| 2015/0260463 A1 | * | 9/2015 | Laughlin | F24S 60/10 165/104.31 |
| 2016/0060460 A1 | * | 3/2016 | Welch | C08G 69/28 436/163 |
| 2017/0271033 A1 | * | 9/2017 | Dodson | B01F 23/808 |
| 2019/0072208 A1 | * | 3/2019 | Liu | F16K 31/52483 |

* cited by examiner

*Primary Examiner* — Binh Q Tran
(74) *Attorney, Agent, or Firm* — Keith A. Vogt; Keith A. Vogt, Ltd

(57) ABSTRACT

A motionless pumping design that reduces operation and maintenance costs, and enhances reliability in three aspects of pneumatics system configuration. A motionless and corrosion-resistant pump which uses the continuous generation of pressure variation push/pull force by relying on the venturi effect induced by a pair of gas ejectors together with an argon pneumatic sub-system.

5 Claims, 4 Drawing Sheets

MOTIONLESS MOLTEN SALT PUMP ON LEVERAGE OF PRESSURE VARIATION FORCE

RELATED APPLICATIONS

This application claims priority to U.S. Provisional Application No. 63/608,767, filed on Dec. 11, 2024, which is incorporated herein in its entirety.

STATEMENT REGARDING FEDERALLY SPONSORED RESEARCH & DEVELOPMENT

Not applicable.

INCORPORATION BY REFERENCE OF MATERIAL SUBMITTED ON A COMPACT DISC

Not applicable.

BACKGROUND OF THE INVENTION

As clean and sustainable energy sources, research and development of commercial nuclear and solar power are supported by federal government agencies, and international institutes and entities to cope with the global warming, and achieve the USA carbon neutrality goal by 2050. Generation IV molten salt reactors (MSRs) and concentrating solar powers (CSPs) leverage high-temperature molten salts as the heat transport and storage medium in thermal power systems. MSRs are characterized by the high outlet temperature of coolant, and render higher thermal power conversion efficiencies up to 45% in comparison of the existing light water reactors at 33% efficiency.

Besides MSRs, high temperature molten salts are promising candidate materials in thermal energy storage and power systems such as CSPs. However, one of unfavorable merits of molten salt reactors is that the high temperature molten salts are extremely corrosive to most of commercial engineering alloys. This can drastically lead to the engineering failures of primary components in the molten salt loops of thermal power systems, especially for the centrifugal pumps.

For example, the significant corrosion of impeller parts results in the performance degradation, flow instability and even loss of flow accident. Apart from corrosion, the application of centrifugal pump to the stable flow drive of molten salt should be assessed the operational stability of impeller, hydraulics loads, high temperature sealing issues, and shaft erosion.

In light of those emerging issues of conventional motional pumps, the magnetohydrodynamic pumping technology seems a better engineering solution to drive the high temperature flows of molten salts. Magnetohydrodynamic pumps for molten salt applications have attractive features including silence, high efficiency, high-temperature tolerance, and compactness.

But on the other hand, the molten salt corrosion on cathode and anode walls would be accelerated by the presence of electrical and magnetic fields. Also, over the operation time, the oxide layer of pipeline could weaken the Lorentz force. Although there are some new engineering alloys that are corrosion resistant to molten salts, it still takes a while to test and license those new alloys before their commercialization. For example, one of MSR construction material candidates, Hastelloy, failed to the certification and codification by the ASME Boiler and Pressure Vessel committee.

This potentially speaks to that construction material and structure optimizations may not be a technically sound path to engineering applications of both centrifugal pumps and magnetohydrodynamic pumps.

SUMMARY OF THE INVENTION

In one embodiment, the present invention concerns a motionless and corrosion-resistant pump.

In another embodiment, the present invention concerns a motionless and corrosion-resistant pump that leverages the pressure variation of a push/pull force.

In another embodiment, the present invention concerns a motionless and corrosion-resistant pump which uses the continuous generation of pressure variation push/pull force by relying on the venturi effect induced by a pair of gas ejectors together with an argon pneumatic sub-system.

In another embodiment, the present invention concerns a motionless and corrosion-resistant pump that is able to satisfy the unique handling requirements of high-temperature molten salt flow (liquid metal flow) including corrosion-resistant, mitigated risks of pump failures, and radioactive material containment.

In another embodiment, the present invention concerns a motionless and corrosion-resistant pump that exhibits the following advantages over the conventional centrifugal pumps: 1) No electrical parts or electronics modules near the molten salt fluid (e.g. motors, sensors, solenoids) requiring high temperature tolerance, or radiation-resistance, which enhances reliability; 2) Intrinsic metering characteristics of PF technologies provides redundant measurement of flow rates and pressure for molten salt fluid monitoring; 3) No direct contact with molten salt fluids or no moving parts (e.g. impellers, bearings, seals) which helps to avoid the corrosion/wear issues, and enhances reliability and safety; and 4) High-temperature tolerance and corrosion-resistance which makes it more suitable for molten salt applications.

In another embodiment, the present invention concerns a motionless and corrosion-resistant pump having a closed loop configuration allows higher pump efficiency and multiple pneumatics gas flow circuits to achieve continuous and stable flow rates.

In another embodiment, the present invention concerns a motionless and corrosion-resistant pump having mechanical parts and electronics modules that are assembled to build the motionless pump in a modular manner, which renders easier troubleshooting and maintenance.

In another embodiment, the present invention concerns a motionless and corrosion-resistant pump wherein the pressure variation mechanism inside the pulsation tube can help mitigate detrimental impacts of water-hammering accident on the molten salt flow loop as well as possible accidents.

In another embodiment, the present invention concerns a motionless and corrosion-resistant pump that leverages the venturi effect inside the gas eductor pair and hydraulics resistance in one or more flow diodes and creates a gas injection/discharge in the pulsation tube for removal of mechanical moving parts.

BRIEF DESCRIPTION OF THE SEVERAL VIEWS OF THE DRAWINGS

In the drawings, which are not necessarily drawn to scale, like numerals may describe substantially similar components throughout the several views. Like numerals having different letter suffixes may represent different instances of substantially similar components. The drawings illustrate generally, by way of example, but not by way of limitation, a detailed description of certain embodiments discussed in the present document.

DESCRIPTION OF THE INVENTION

Detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a representative basis for teaching one skilled in the art to variously employ the present invention in virtually any appropriately detailed method, structure or system. Further, the terms and phrases used herein are not intended to be limiting, but rather to provide an understandable description of the invention.

Figure 2:
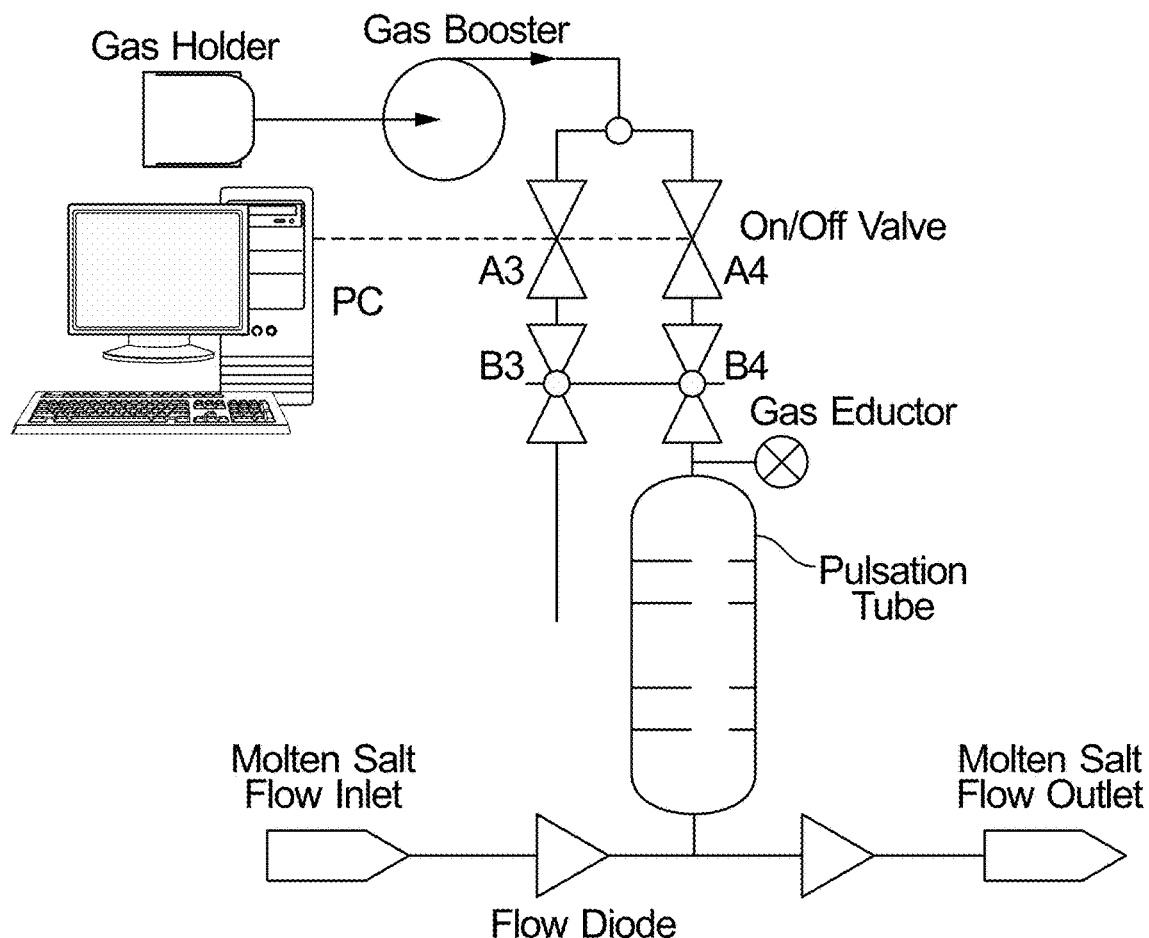
FIG. 2 shows an open loop configuration of motionless pump design.

In light of major defects of existing PF-based molten salt pumping designs, the present invention provides an improved motionless pumping design that reduces operation and maintenance costs, and enhances reliability in three aspects of pneumatics system configuration as follows:
1) Modification from an open loop configuration of gas pneumatics (as shown in FIG. 2) to the closed loop configuration to achieve higher power economy and improved energy usage efficiency.
2) Multiple gas pneumatics flow circuits to coordinate the molten salt pumping and stabilize mass flow rates.
3) Analytical conversion modelling from arduous metering of salt fluid flow to easy procurement of gas flow pressure for the redundant measurement of flow rates, and accurate assistance in mass accountancy.

Figure 1:
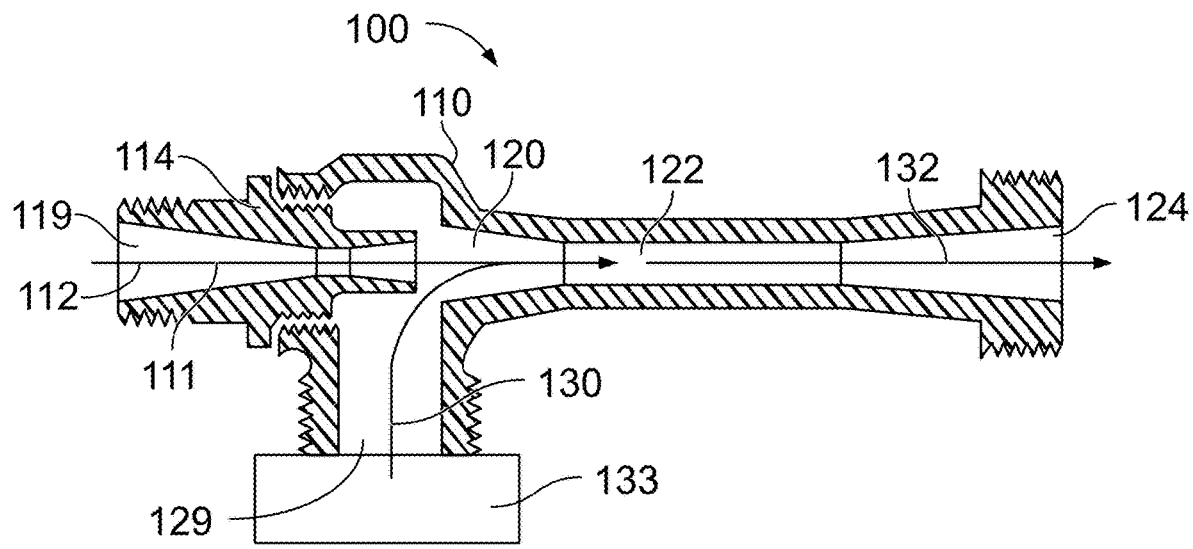
FIG. 1 is a schematic view of gas ejector for an embodiment of the present invention.

As shown in FIG. 1, the components of motionless molten salt pump 100, of one embodiment of the present invention, includes gas ejector 110 which contains first fluid 112 received at intake 111. Fluid 112 flows through jet nozzle 114 that has channel 119 having a first section 120, a second section 122 and a third section 124. The cross-sectional area of channel 119 narrows from section 120 to 122 and then expands again at section 124. The narrowing and expansion cause fluid 112 to leave at high velocity. This is due to Bernoulli's principle induced the low-pressure regime at the downstream.

The pressure drop created by fluid 112 across suction nozzle 129 drags second fluid 130 out of reservoir 133 through suction section 132 whereby it is mixed with the upstream intake fluid 112 from intake 111.

Figure 3A:
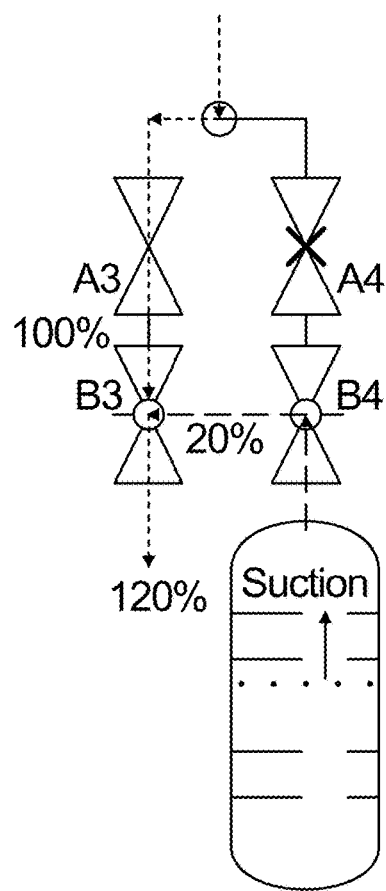
FIGS. 3A and 3B show a gas flow direction at the suction and drive stages respectively for an embodiment of the present invention.
Figure 3B:
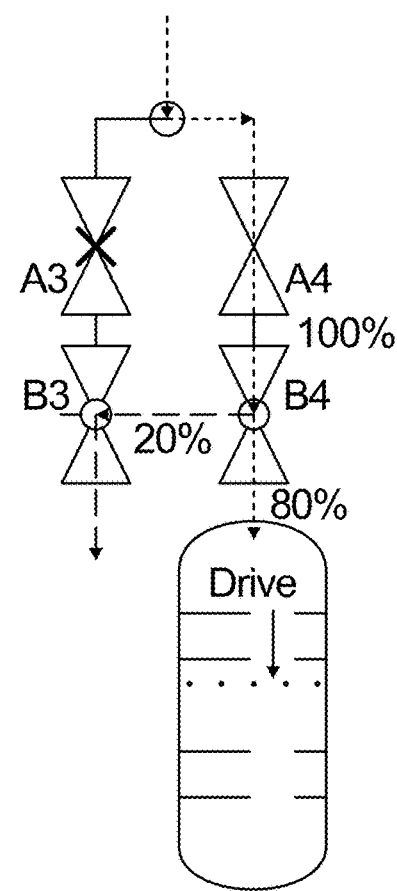

By the pair-up introduction of two gas ejectors together on a pulsation tube, the pressure variation unbalance arises between the pulsation and salt storage vessel. As a result the molten salt would be either pumped into the pulsation tube by the gas removal or driven back to the salt vessel by the gas addition. As illustrated in FIG. 3(*a*), under the A3 valve open, and the A4 valve closed, the dominant intake gas flow can prompt the secondary flow out of the pulsation tube, further lead to the molten salt suction from the salt vessel to the pulsation tube due to pressure decreasing. While on the contrary, the dominant intake flow can push gas back to the pulsation tube and drive the molten salt back to the salt vessel owing to pressure increasing (See FIG. 3(*b*)).

Figure 4:
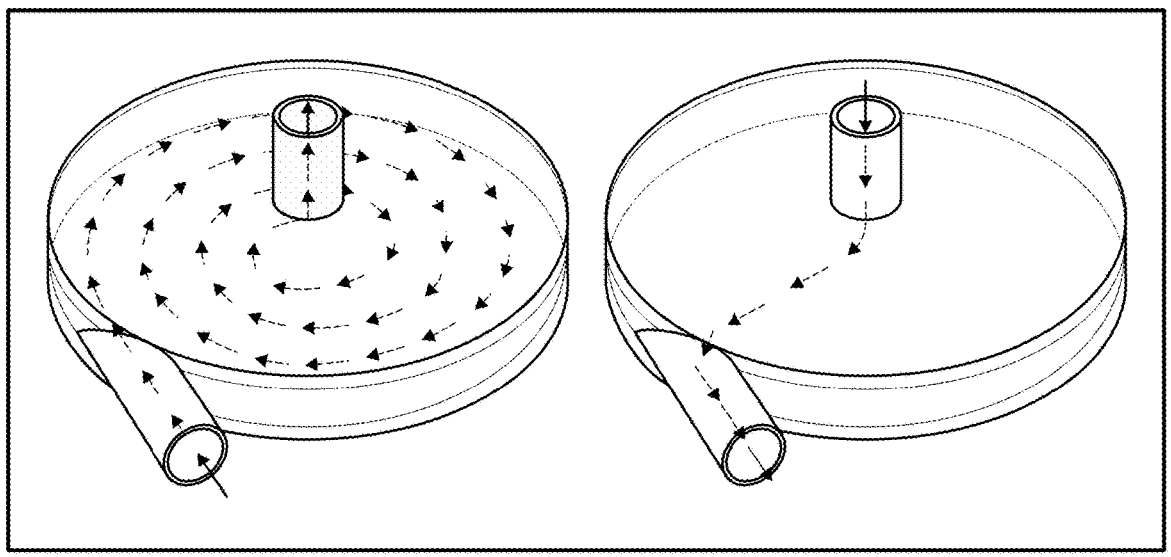
FIG. 4 is a CAD model view of vortex diode: reverse flow (left) and forward (right) for an embodiment of the present invention.
Figure 5A:
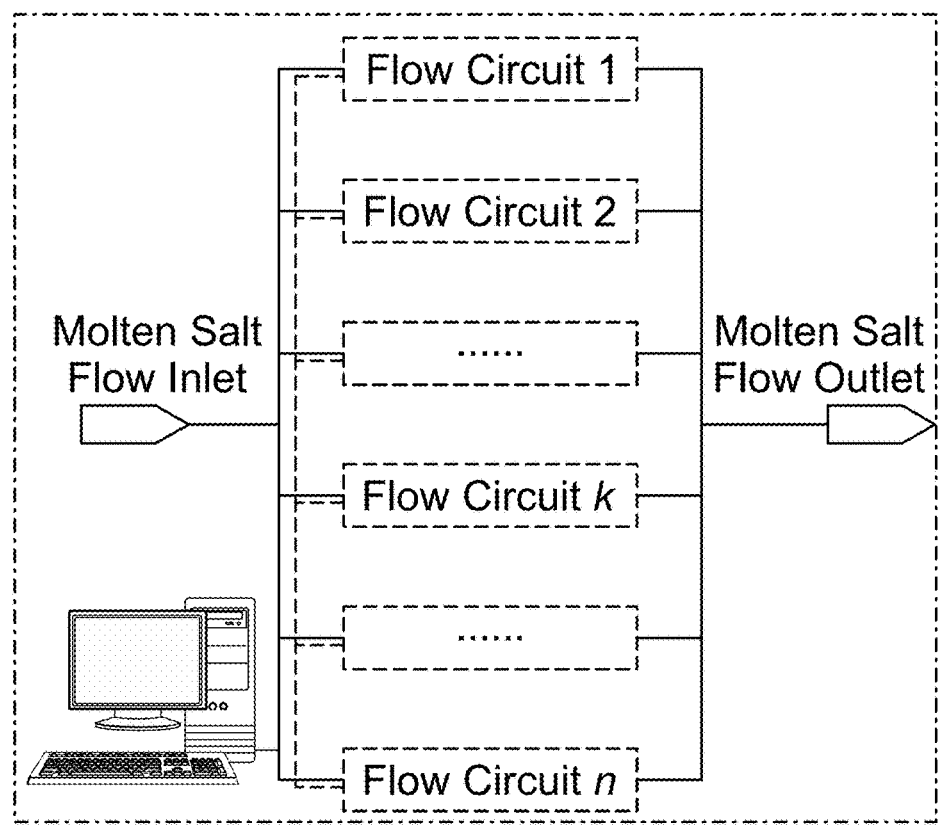
FIGS. 5A and 5B shows closed loop configuration of motionless pump design: (a) pumping by multiple for an embodiment of the present invention.
Figure 5B:
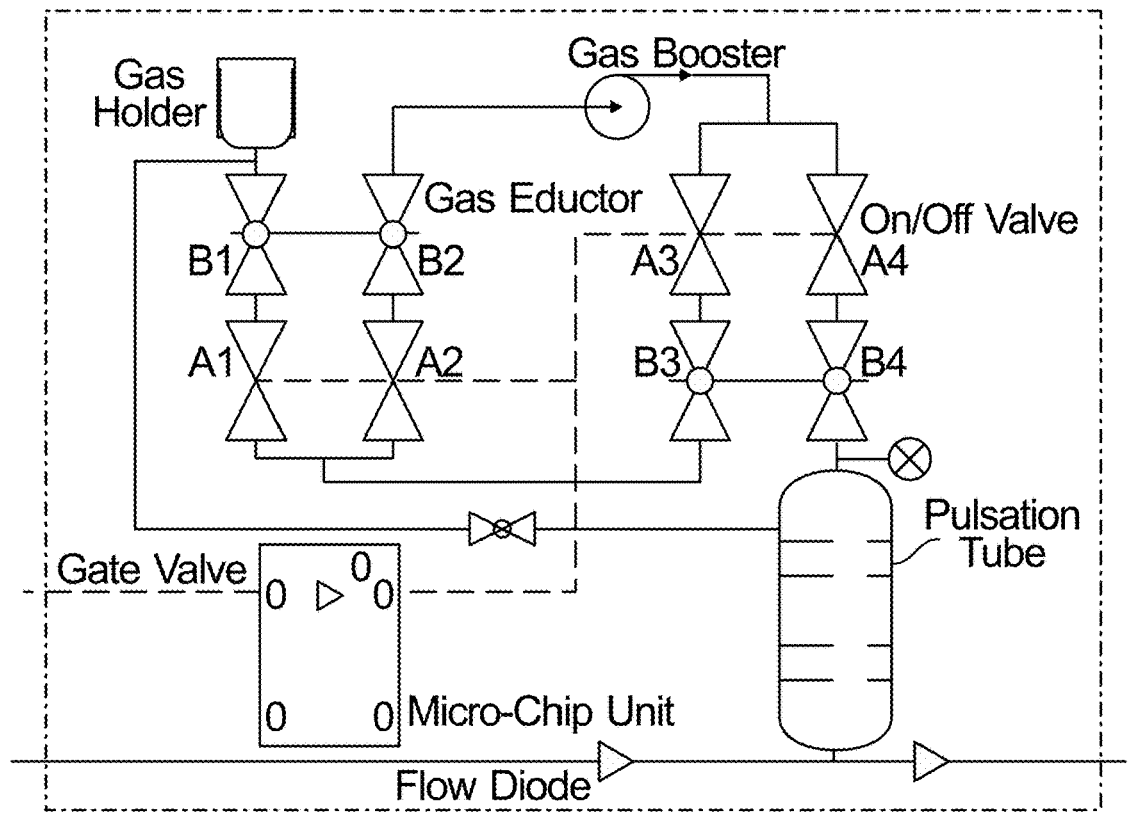

Flow diodes (See FIG. 4) serve as the mechanical regulation of fluid flow direction, and the reverse flow prevention by exploiting vertex resistance generated by geometrical patterns. Two flow diodes are demanded to prevent the reverse flow of molten salt fluids during the suction and drive stages respectively.

Figure 6:
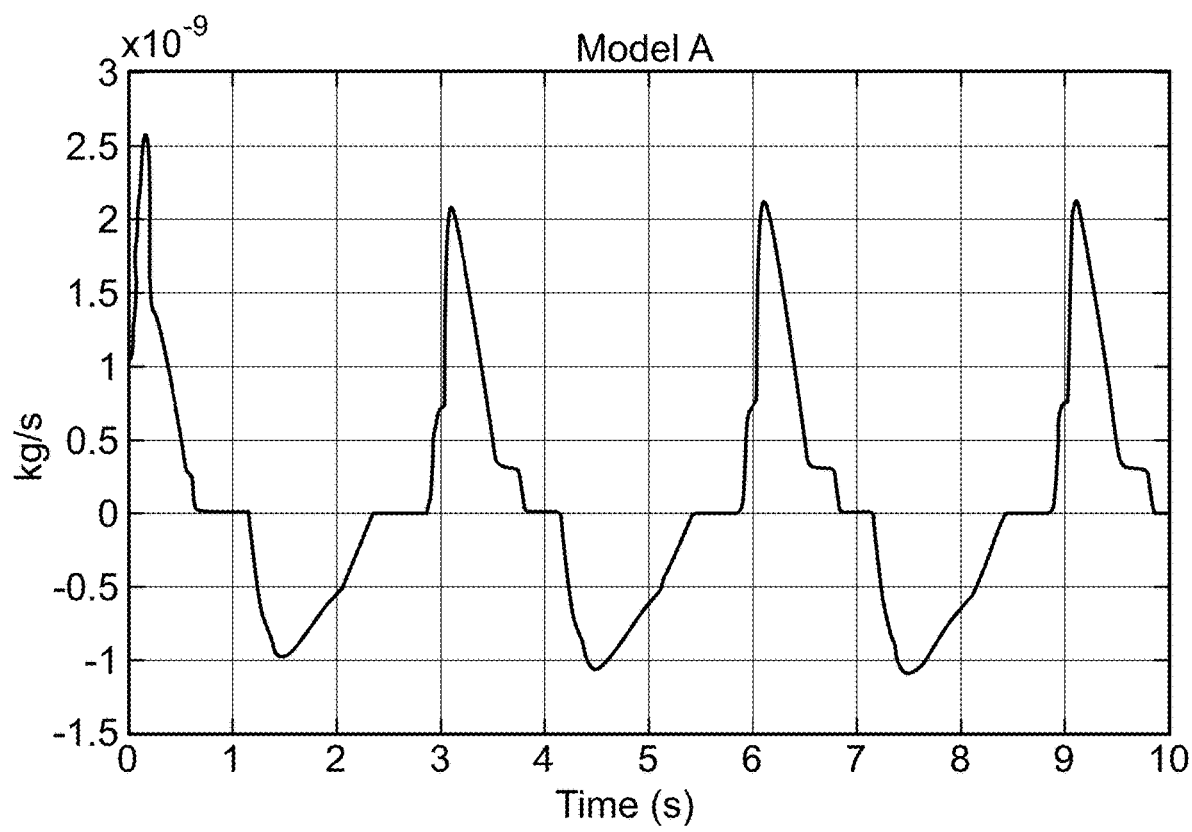
FIG. 6 shows the molten salt flow behaviors induced by the single pneumatics flow circuit for an embodiment of the present invention.

Achievement of higher power economy and of better energy usage efficiency is to store the pressurized fluid flow in the temporary gas holder at the suction stage while to release the pressurized flow back to the pulsation tube at the drive stage (See FIG. 6(*b*)). For example, the microchip unit turns valves A1 and A3 on while shuts valves A2 and A4 off to transport the gas from the pulsation tube to the gas holder, and pump molten salt fluid into the pulsation tube due to the pressure decrease. On the contrary, the state switch among four on/off valves leads to molten salt driven back to the reservoir vessel.

The harmonic coordination between multiple gas flow circuits is fine-tuned by the microchip unit controllers and computer automation algorithms. For example, it is of importance to decide when to open and close the on/off valves and how to regulate the driving modes of gas boosters for highly stable and continuous flow of molten salt. This enables the early detection of water-hammering effects, and helps reduce the corresponding impacts on the flow loop pipeline.

The primary rationale behind the system configuration with multiple gas flow circuits is to (1) convert the discrete and oscillatory flow patterns of a single pneumatics gas flow circuit into the continuous and stable flows. Because due to the theoretical working principles of proposed pumping design, the single pneumatics gas flow circuit yields the discrete and oscillatory flow behaviors as shown in FIG. 7.

While the foregoing written description enables one of ordinary skill to make and use what is considered presently to be the best mode thereof, those of ordinary skill will understand and appreciate the existence of variations, combinations, and equivalents of the specific embodiment, method, and examples herein. The disclosure should therefore not be limited by the above-described embodiments, methods, and examples, but by all embodiments and methods within the scope and spirit of the disclosure.

What is claimed is:

1. A motionless and corrosion-resistant pumping system that leverages the pressure variation of a push/pull force comprising: a plurality of gas ejectors located on a pulsation tube and a salt storage vessel wherein a pressure variation unbalance arises between the pulsation causing molten salt to be either pumped into the pulsation tube by the removal of gas or driven back to the salt vessel by the addition of gas; a first and second valve operable between an open and closed position; when said first valve is opened, and said second valve is closed, intake gas flow prompts the secondary flow out of the pulsation tube leading to the suction of molten salt from the salt vessel to the pulsation tube due to pressure decreasing; when said first valve is closed, and said second valve is open, intake gas flow prompts the secondary flow out of the pulsation tube leading to the molten salt suction from the salt vessel to the pulsation tube due to pressure owing to pressure increasing.

2. The motionless and corrosion-resistant pumping system of claim 1 wherein a closed loop configuration allows for higher pump efficiency.

3. The motionless and corrosion-resistant pumping system of claim 1 further including a plurality of flow diodes that regulate the fluid flow direction, and prevent reverse flow by exploiting vertex resistance generated by geometrical patterns.

4. The motionless and corrosion-resistant pumping system of claim 1 wherein harmonic coordination between multiple gas flow circuits is fine-tuned by a microchip unit controllers and computer automation algorithms.

5. The motionless and corrosion-resistant pumping system of claim 4 wherein stable and continuous flow of molten salt is controlled by opening and closing said plurality of valves.

* * * * *